United States Patent Office 3,631,049
Patented Dec. 28, 1971

3,631,049
BIS-TETRAHYDROQUINOLINE METHINE COMPOUNDS
James M. Straley and David J. Wallace, Kingsport, Tenn., assignors to Eastman Kodak Company, Rochester, N.Y.
No Drawing. Original application Apr. 27, 1966, Ser. No. 545,546, now Patent No. 3,504,010, dated Mar. 31, 1970. Divided and this application Dec. 4, 1969, Ser. No. 882,287
Int. Cl. C07d 33/10
U.S. Cl. 260—283 CN    3 Claims

ABSTRACT OF THE DISCLOSURE

Methine dye compounds having the general formula

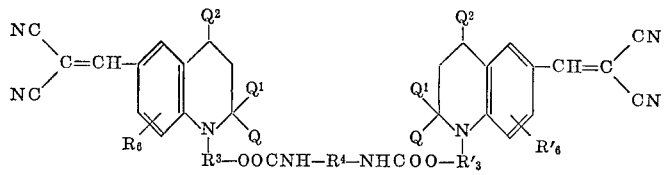

wherein Q, $Q^1$ and $Q^2$ each is hydrogen or methyl; $R_3$ and $R'_3$ each is lower alkylene; $R^4$ is alkylene, methylenediphenylene, arylene or cyclohexylenedimethylene; and $R_6$ and $R'_6$ each is hydrogen, alkyl, alkoxy or halogen. The disclosed compounds are useful as dyes for hydrophobic textile materials such as polyester fibers on which the compounds exhibit improved resistance to sublimation.

---

This application is a division of our U.S. application Ser. No. 545,546, filed Apr. 27, 1966, for "Methine Dyes for Hydrophobic Fibers, now U.S. Pat. 3,504,010."

This invention relates to new compounds useful as dyes. More particularly this invention relates to new methine compounds especially useful as dyes for textile fibers, yarns and fabrics.

In the dyeing and printing of textile materials such as fibers, filaments, woven and nonwoven textiles and similar articles of high molecular weight, substances such as cellulose esters, polyamides, polyesters, acrylics and the like, it is of prime importance that the dyes have high color strength and good fastness, e.g. to bleaching, rubbing, drycleaning, heat, atmospheric fumes, perspiration and washing. The dyes should, especially, have good fastness to light.

The methine compounds of the invention possess such properties and have the following general formula:

I.

$$\underset{Y}{\overset{X}{>}}C=CH-Z-M-Z'-CH=C\underset{Y'}{\overset{X'}{<}}$$

wherein X, Y, X' and Y' represent cyano; amide radicals such as carbamoyl, lower alkylcarbamoyl, phenylcarbamoyl, sulfamoyl, lower alkylsulfamoyl, etc.; lower alkoxycarbonyl radicals such as —COOCH$_3$ and —COOC$_3$H$_7$; lower cyanoalkoxycarbonyl radicals such as

—COOC$_2$H$_4$CN or a lower alkylsulfonylsulfonyl radical such as methylsulfonyl; Z and Z' represent groups derived from an aromatic amine such as a monocyclic carbocyclic aromatic amine including aniline and aniline derivatives, for example, N-methylaniline, N-ethylaniline, 3-methylaniline, 3-chloroaniline, etc., and bicyclic amines, e.g. substituted and unsubstituted dihydroindoles,

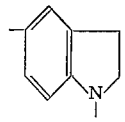

tetrahydroquinolines

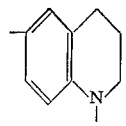

and hydrogenated benzopines,

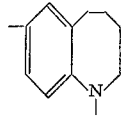

preferably wherein the nitrogen moiety is either ortho or para with respect to the point of attachment of the methine grouping; and M represents a bis-urethane derivative for example wherein the urethane groups are connected to each other by at least one of the following; alkylene groups having up to 8 carbon atoms, e.g. methylene, ethylene, neopentylene, 1,4-cyclohexanedimethylene, etc.; arylene groups, i.e. a monocyclic aromatic ring of the benzene series, e.g. phenylene, methylphenylene, dimethylphenylene, chlorophenylene; arylenedi-lower-alkylene, e.g. 1,4-phenylenedimethylene, etc. The urethane groups preferably are attached to the nitrogen moiety of the aromatic amines Z and Z' via an alkylene group, especially by a lower alkylene, e.g. methylene, ethylene, propylene, etc. When used herein to describe a group containing an alkyl moiety, "lower" designates a carbon content of up to about 4 carbon atoms.

Particularly useful compounds of this invention are those compounds wherein Z, of Formula I, represents

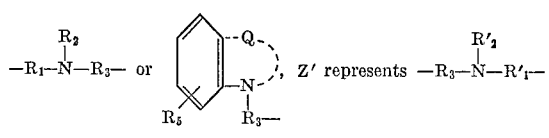

or

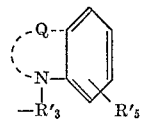

and M represents

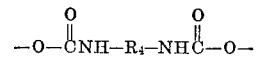

These compounds are represented by general Formulas II and III

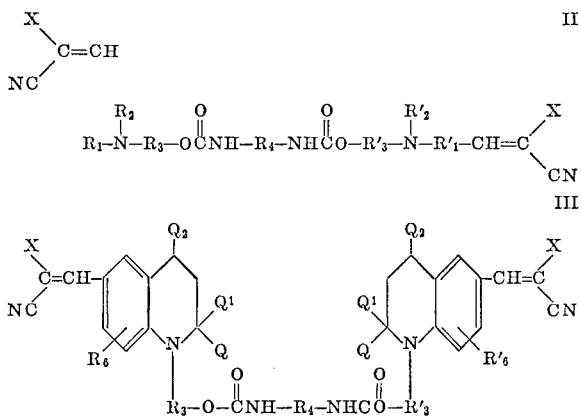

wherein X is as defined above, $R_1$ and $R'_1$ represent monocyclic carbocyclic groups of the benzene series including phenylene and substituted phenylene such as p-phenylene, lower alkylphenylene, e.g. o,m-methyl-p-phenylene, lower alkoxyphenylene, e.g. o,m-methoxy-p-phenylene, halophenylene, e.g. o,m-chloro-p-phenylene, or o,m-bromo-p-phenylene.

$R_2$, $R'_2$, $R'_5$ and $R_5$ represent hydrogen or alkyl radicals including unsubstituted alkyl, preferably lower alkyl, i.e. from 1 to 4 carbon atoms, and substituted alkyl such as alkoxyalkyl, e.g. methoxyethyl, cyanoalkyl, e.g. cyanoethyl, cyanoalkoxyalkyl, e.g. β-cyanoethoxyethyl, acyloxyalkyl, e.g. acetoxyethyl, carboalkoxyalkyl, e.g. carboethoxyethyl, halogenoalkyl, e.g. chloroethyl, hydroxyhalogenoalkyl, e.g. β-hydroxy-γ-chloropropyl, alkylsulfonylalkyl, e.g. methylsulfonylethyl, alkyl, $OCOOCH_2CH_2—$, e.g. $CH_3OCOO_2CH_2CH_2—$; carboxyamidoalkyl, e.g. carboxyamidoethyl; benzyl; phenoxyalkyl, e.g. β-phenoxyethyl; cyanoalkyl, e.g. β-cyanoethyl; alkylsulfonamidoalkyl, e.g. methylsulfonamidoethyl; alkylcarbonamidoalkyl, e.g. ethylcarbonamidoethyl; dicarboxamidoalkyl, e.g. β-dicarboxamidoethyl; etc. or $R_2$ and $R'_2$ represent a monocyclic carbocyclic aromatic group of the benzene series, e.g. unsubstituted phenyl and substituted phenyl, e.g. alkylphenyl, alkoxyphenyl, etc.

$R_3$ and $R'_3$ represent lower alklene groups, i.e. a substituted or branched straight or branched chain of from 1 to 4 carbon atoms, e.g. methylene, ethylene, chloroethylene, etc. $R_4$ represents at least one of the following: alkylene groups, e.g. methylene, ethylene, butylene, cyclohexylene, cyclohexylenedimethylene, etc.; a monocyclic carbocyclic group of the benzene series as for example, those suggested as suitable for the groups $R_1$ and $R'_1$; or combination of such groups such as arylenedi-lower-alkylene groups and lower-alkylene-diarylene groups, e.g.

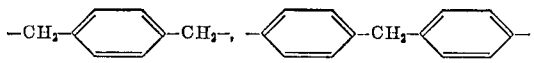

etc.

Q, $Q^1$ and $Q^2$ each represent hydrogen or lower alkyl and $R_6$ and $R'_6$ each represent hydrogen, lower alkyl, lower alkoxy, or halogen. The substituents attached to the

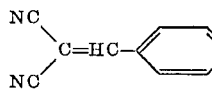

ring nucleus of Z' or to N are not critical and serve primarily as auxochromes to control the color of the methine compound.

The methine compounds of this invention can be prepared by reacting a bis-isocyanate for example of the formula

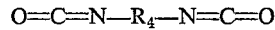

wherein $R_4$ is as described above, with an appropriate N-(hydroxyalkyl) aniline derivative. The aromatic rings of the aniline moieties of the resultant bis-urethane are then formulated thereby forming a bis-urethane-dialdehyde. The aldehydic groups are then reacted with an active hydrogen compound of the general formula $X—CH_2—CN$.

The resultant methine compounds can be used for dyeing textile materials including synthetic polymer fibers, yarns and fabrics giving fast shades of yellow, when applied thereto by conventional dyeing methods. The compounds have moderate affinity for cellulose ester and polyamide fibers and possess the valuable property of staining wool less than do previous methine dyes. When the methine compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative methine compounds of our invention.

EXAMPLE I (a) Preparation of the bis-urethane.—A mixture of 33 g. of N-ethyl-N-β-hydroxyethylaniline, 17.4 g. tolylene-2,4-diisocyanate, and 100 ml. benzene was stirred and refluxed for 3 hours. While still hot, the solution was poured into a 250 ml. beaker and allowed to stand overnight at room temperature. The bis-urethane precipitated and was filtered off, washed with benzene, and dried. The yield was 40.9 g. of a white solid, Mp. 97–98° C. Analysis for C and H checked well for the compound of the following structure:

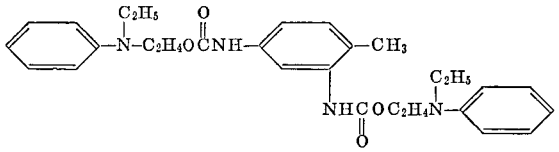

(b) Preparation of the dialdehyde.—13 g. of the product from (a) above was dissolved in 100 ml. dry dimethylformamide. The solution was stirred and cooled in ice and 6 ml. $POCl_3$ was added dropwise with the reaction temperature 10°–15° C. When the addition was complete, the reaction was heated 2 hours on the steam bath. The reaction mixture was drowned in 1 liter of water, and it all dissolved, then came back out as a sticky mass. The gummy material solidified after several water washings by decantation. This product was ground under water, filtered, washed with water, and dried at room temperature. It was used directly in the next step without further purification.

(c) Preparation of the dye.—All of the product from (b) above, 3.3 g. malononitrile, and 250 ml. ethanol, in the presence of 2 drops piperidine for catalyst, were heated on the steam bath 2 hours. On cooling to room temperature, a glassy precipitate resulted. The alcohol was decanted, and the glass allowed to stand overnight. It was then ground an dried in the air. The yield was 8.4 g. of a yellow dye of outstanding fastness to dry sublimation on polyesters. A sample recrystallized from n-amyl alcohol melts at 102–103° C. The dye has the following structure.

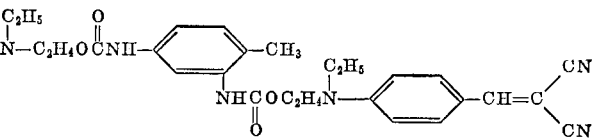

The following table shows additional examples of dyes which were prepared according to the general method outlined in Example I. The substituents indicated are with reference to Formula I.

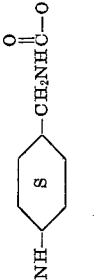

The methine compounds of the invention may be used for dyeing hydrophobic fibers such as linear polyester, cellulose ester, acrylic, polyamide, etc., fibers in the manner described in U.S. Pats. 2,880,050; 2,782,187 and 2,043,827. These dyes all render such fibers varying shades of yellow and have excellent light fastness and resistance to sublimation. The following examples illustrate methods by which the methine compounds of the invention can be used to dye polyester textile materials.

0.1 gram of the dye is dissolved in the dye pot by warming in 5 cc. of ethylene glycol monomethyl ether. A 2% sodium-N-methyl-N-oleoyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 g. of textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be effected, for example, by incorporating the methine compounds into the spinning dope and spinning the fiber as usual. The methine compounds of our invention have varying utility as dyes. The degree of utility varies, for example, depending upon the material being dyed and the formula of the methine compound. Thus, for example, all of the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new methine compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Pat. 2,901,446. Dacron and Terylene polyester fibers are described, for example, in U.S. Pat. 2,465,319. The polymeric linear polyester materials disclosed in U.S. Pats. 2,945,010; 2,957,745 and 2,989,363, for example, can be dyed. The linear aromatic polyester materials specifically named have a melting point of at least 200° C.

Nylon, in fiber, yarn and fabric form is representative of polyamides which can be dyed with the methine compounds.

The invention has been described in considerable detail with particular reference to certain preferred embodiments thereof, but it will be understood that variations and modifications can be effected within the spirit and scope of the invention as described hereinabove.

We claim:

1. A compound having the formula

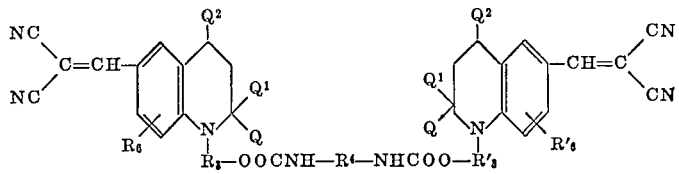

wherein
Q, $Q^1$ and $Q^2$ each is hydrogen or methyl;
$R_3$ and $R'_3$ each is lower alkylene;
$R^4$ is alkylene of up to 8 carbon atoms, methylenediphenylene, phenylene, lower alkylphenylene, lower alkoxy-phenylene, halophenylene, or cyclohexylenedimethylene; and
$R_6$ and $R'_6$ each is hydrogen, lower alkyl, lower alkoxy or halogen.

2. A compound according to claim 1 wherein $R_6$ and $R'_6$ each is hydrogen or methyl; and $R^4$ is alkylene of up to 8 carbon atoms, phenylene or methylphenylene.

3. The compound according to claim 1 having the formula

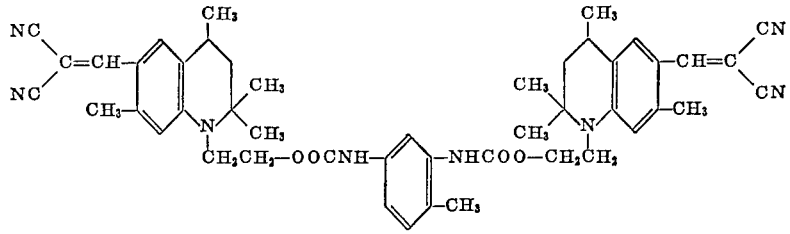

References Cited

UNITED STATES PATENTS

| 3,247,211 | 4/1966 | Weaver et al. | 260—287 |
| 3,386,491 | 6/1968 | Weaver et al. | 260—287 |
| 3,504,010 | 3/1970 | Straley et al. | 260—287 X |

DONALD G. DAUS, Primary Examiner

U.S. Cl. X.R.
260—287 R, 283 SA